April 29, 1952 — C. R. BUTTON — 2,594,288
FLUID MOTOR ASSEMBLY
Filed Oct. 29, 1945 — 4 Sheets-Sheet 1
Fig. 1
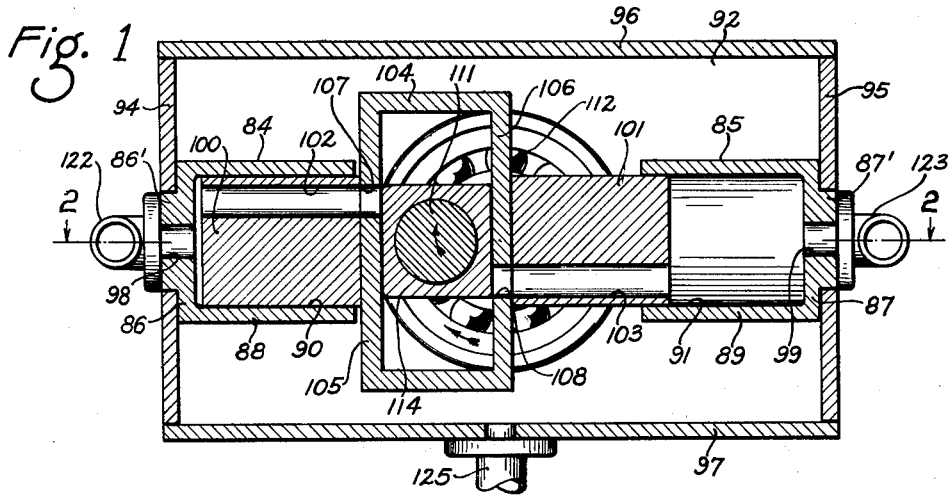
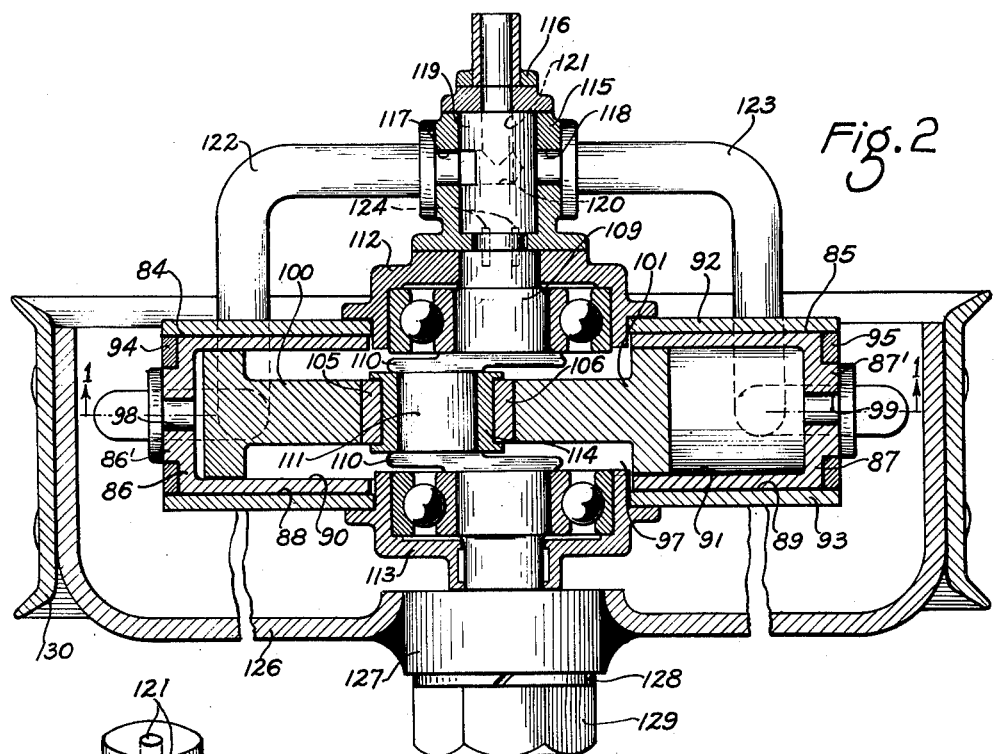
Fig. 2
Fig. 3
Clarence Ray Button
INVENTOR
BY *George A. Gillette Jr.*
ATTORNEY April 29, 1952     C. R. BUTTON     2,594,288
FLUID MOTOR ASSEMBLY
Filed Oct. 29, 1945     4 Sheets-Sheet 2
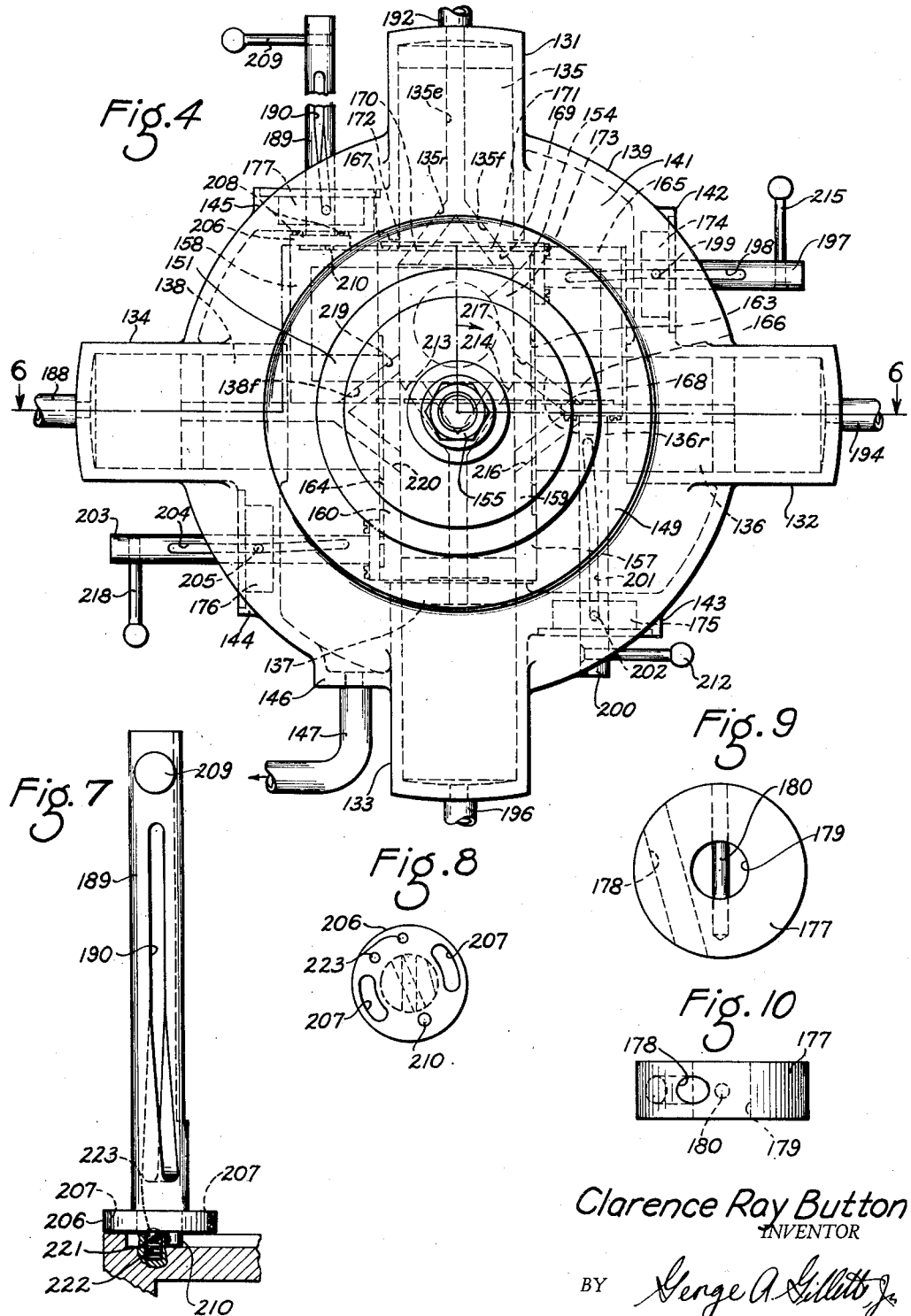
Clarence Ray Button
INVENTOR
BY 
ATTORNEY Clarence Ray Button
INVENTOR BY George A. Gillette Jr.
ATTORNEY April 29, 1952 C. R. BUTTON 2,594,288
FLUID MOTOR ASSEMBLY
Filed Oct. 29, 1945 4 Sheets-Sheet 4

Clarence Ray Button
INVENTOR
BY George A. Gillette
ATTORNEY

Patented Apr. 29, 1952

2,594,288

UNITED STATES PATENT OFFICE 2,594,288

FLUID MOTOR ASSEMBLY

Clarence Ray Button, Rochester, N. Y.

Application October 29, 1945, Serial No. 625,259

13 Claims. (Cl. 121—121)

1

The present invention relates to a fluid motor assembly and more particularly to a fluid motor assembly having a uniform path for the fluid so that higher speed and efficiency of operation are attainable.

The primary object of the present invention is the provision of a fluid motor assembly in which the fluid exhaust is in substantially the same direction as movement of the fluid during displacement of the piston for its working stroke.

Another object of the invention is a fluid motor assembly in which the fluid exhaust extends through the piston member for discharging fluid from the cylinder substantially in the same direction as the working stroke of the piston member.

A further object is a fluid motor assembly which is capable of high speed operation and compact enough to be mounted within the wheel of an automobile or similar vehicle.

Still another object of the invention is a fluid motor assembly in which a fluid exhaust passage is provided through the piston member and in which a motion transmitting means has a member movable to open and close said fluid exhaust passage in proper timed relation to movement of the piston member.

A still further object of the invention is a fluid motor assembly that can be readily reversed.

Another object is the provision of a fluid motor assembly having a pair of fluid exhaust passages through the piston member and a reversing means for closing one and opening the other of said fluid exhaust passages to reverse the direction of rotation of said motor assembly.

A further object is the provision of a fluid motor assembly having a pair of fluid exhaust passages through the piston member thereof and a mechanically operated reversing means for controlling the opening and closing of said passages for forward or reverse rotation of said motor assembly.

Still another object is a fluid motor assembly having one or more pairs of cylinders and embodying the fluid uniflow principle of the invention for high efficiency and high speed operation and compact construction of the assembly.

Other and further objects of the invention, such as special arrangements of the piston members, of the exhaust passages therethrough, and of the reversing means, will be apparent to those skilled in the art from the description which follows.

To this end my invention consists in the novel construction, arrangement and combination of parts herein shown and described and more particularly pointed out in the appended claims.

2

Reference is now made to the accompanying drawings wherein like reference characters designate like or corresponding parts and wherein:

Fig. 1 is a vertical section of a two cylinder fluid motor assembly according to the invention and is taken on the line 1—1 of Fig. 2.

Fig. 2 is a horizontal section of said two cylinder fluid motor assembly taken on the line 2—2 of Fig. 1.

Fig. 3 is a perspective of the fluid inlet valve operated by the shaft of said two cylinder fluid motor assembly.

Fig. 4 is a front elevation of a four cylinder fluid motor assembly according to the invention.

Fig. 7 is a side detail of the valve operator.

Fig. 8 is a bottom view of said valve operator.

Figs. 9 and 10 are respectively top and side views of the fluid inlet valve.

Figure 5:
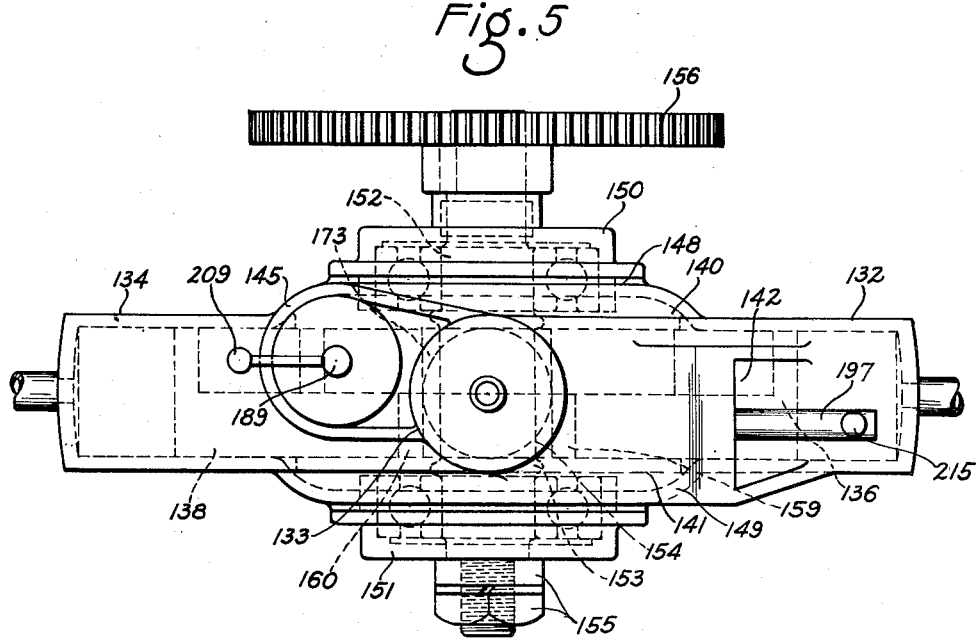
Fig. 5 is a top view of said four cylinder fluid motor assembly.

Throughout the specification and claims and as the context permits, the term "fluid" is used in its broader sense of including liquids and gases, although certain of the advantages of the invention are more marked when liquids or hydraulic pressures are employed within the fluid motor assembly.

Generically the fluid motor assembly of the invention comprises one or more cylinders each providing a work chamber, a piston member in each cylinder, a fluid inlet means, and a fluid outlet means. A motion transmitting means is arranged between the piston member and the driven shaft or axle and in the preferred form of the invention members of said motion transmitting means control the time of operation of valves in the fluid inlet and in the fluid outlet means. Also the invention basically contemplates a reversing means provided in several ways which depend upon the structures providing the uniflow action within the cylinders of the fluid motor assembly.

The simplest illustrated embodiment of the invention is shown in Figs. 1, 2 and 3 and comprises a two cylinder motor assembly driving a wheel, such as an automobile wheel, which may encircle the motor assembly. Although such two cylinder fluid motor assembly is not shown with reversing means it may readily be made reversible by the other arrangement disclosed herewith.

Such two-cylinder fluid motor assembly comprises a pair of cylinders 84 and 85 each having respectively heads 86 and 87 and walls 88 and 89 providing work chambers 90 and 91. A housing supports said cylinders 84 and 85 and also provides a crank case therefor. Such a housing comprises side plates 92 and 93, end plates 94 and 95, top plate 96 and bottom plate 97. Said plates 92–97 are fastened along their margins in fluid tight relation in any well known manner or may be formed integrally with each other and with the cylinders 84 and 85. The cylinders 84 and 85 are mounted laterally between side plates 92 and 93, while the head 86 of cylinder 84 is fastened to end plate 94 and the head 87 of cylinder 85 is mounted upon end plate 95. Preferably each of cylinder heads 86 and 87 respectively have ertensions 86' and 87' provided with inlet openings 98 and 99 which are connected to the fluid inlet means in a manner to be described later. Said side plate 92 may constitute a mounting support for the entire fluid motor assembly and may be mounted in any convenient manner to a base or the chassis of an automobile.

A piston member 100 fits into the work chamber 90 of cylinder 84 and a piston member 101 fits into the work chamber 91 of cylinder 85. Preferably said cylinders 84 and 85 are mounted on said housing in diametrically opposed relation and with their center lines and the center lines of piston members 100 and 101 on the same straight line or axis. A fluid exhaust passage 102 is provided in piston member 100 and a fluid exhaust passage 103 is provided in piston member 101, and said fluid exhaust passages 102 and 103 are displaced in opposite directions from the axis through the center lines of said piston members 100 and 101. The inner portions of said piston members 100 and 101 may each be laterally recessed on both sides, see Fig. 2, to provide a T-shaped horizontal cross-section therefor.

The motion transmitting means comprises a yoke member, a transversely moving bearing member, and a crank shaft journaled in said housing. The yoke member 104 is rectangular in form and has sides 105 and 106 respectively fastened in any suitable fashion to the inner ends of piston members 100 and 101. Yoke side 105 is provided with a port 107 registering with fluid exhaust passage 102 and yoke side 106 is provided with a port 108 in registry with fluid exhaust passage 103.

The crank shaft 109 includes crank arms 110 and a crank pin 111 and is journaled in ball bearing assemblies 112 and 113 which are mounted respectively in side plates 92 and 93 of the housing. The transversely moving member of the motion transmitting means is a bearing block member 114 rotatable on crank pin 111, mounted to reciprocate within said rectangular yoke member 104 and constitutes therewith the well-known Scotch yoke. As best seen from Fig. 1, the relative positions of ports 107 and 108 are such that said bearing block member 114 closes both of said ports 107 and 108 for the instant when piston members 100 and 101 are at the ends of their working and return strokes. Said member 114 also closes ports 107 and 108 during the working strokes of the respective piston members 100 and 101 and opens said ports 107 and 108 during the return strokes of the respective piston members 100 and 101.

The fluid inlet means is arranged to connect a source of fluid under pressure alternatively to the work chambers 90 and 91 in proper timed relation to the opening and closing of ports 107 and 108 by the transversely moving member of the motion transmitting means. According to the invention and as shown in Fig. 2, the fluid inlet means includes a valve member driven by crank shaft 109 and appropriate fluid connections. A valve housing 115 mounted at one end on the casing of ball bearing assembly 112 is connected at its other end to a coupling 116 which communicates with a source of fluid under pressure, and is provided at opposite sides with outlets 117 and 118. A cylindrical valve member 119 is rotatably mounted within said valve housing 115, is centrally provided with a transverse slot 120 alternatively registering with outlets 117 and 118, and has an internal bore 121 for connecting said slot 120 with coupling 116 and a source of fluid under pressure. A fluid inlet pipe 122 is connected at one end to valve housing 115 over outlet 117 and at its other end to extension 86' in communication with inlet opening 98. A second fluid inlet pipe 123 is connected at one end to valve housing 115 over outlet 118 and at its other end to extension 87' of cylinder head 87 and conducts fluid under pressure from said outlet 118 to cylinder inlet opening 99. The valve member 119 is connected by dowel pins 124 or in any other manner to the end of crank shaft 109 to rotate therewith.

The fluid outlet means for the two cylinder fluid motor assembly of the invention are provided respectively by the exhaust passages 102 and 103, ports 107 and 108, and bearing block member 114. Note that exhaust passages 102 and 103 extend in the direction of movement of the piston members 100 and 101 during their respective working strokes. The fluid discharged from both of such fluid outlet means is collected in the housing from whence it may be removed by gravity or suction to a reservoir and/or pump. For this purpose a fluid outlet pipe 125 is provided on bottom plate 97 of the housing.

The effectiveness and compactness of the fluid motor assembly according to the invention is forcibly demonstrated by the fact that the entire motor assembly may be placed within the rim of a standard automobile wheel. As shown in Fig. 2 such standard automobile wheel 126 has a hub 127 mounted on crank shaft 109 by a washer 128 and nut 129 and has a rim 130 which overhangs the inner side of said fluid motor assembly.

Assuming clockwise rotation of crank shaft 109, a supply of fluid under pressure connected to the internal bore 121 of valve member 119, and positions of the parts as shown in Figs. 1 and 2, piston 101 has just completed its working stroke and valve outlet 118 is closed by valve member 119 while outlet 117 is just about to be opened thereby. Likewise exhaust ports 107 and 108 are both closed by member 114, port 107 just having been closed after the return stroke of piston member 100 and port 108 is just about to be opened during the return stroke of piston 101. During rotation of crank shaft 109 through 180° from the position shown, the valve member 119 conducts the fluid under pressure to outlet 117, pipe 122 and opening 98 to work chamber 90. At the same time the bearing block member 114 keeps exhaust port 107 closed but on the other hand opens port 108 to permit discharge from the work chamber 89 of the fluid therein in the direction of its movement which caused the working stroke of piston member 101. Such discharge of the fluid in the same direction as its momentum provides extremely rapid fluid exhaust and greatly reduces the back pressure in the cylinder, all of which makes possible speed and efficiency of operation not heretofore obtainable. Precisely at 180° from that shown all inlet and outlet valves are momentarily closed and during the rotation of crank 199 from 180° to 360°, valve outlet 117 is closed and valve outlet 118 is opened while exhaust port 107 is open and exhaust port 108 is closed. Whereupon the cycle is repeated.

The fundamental principles according to the invention of fluid motor operation and reversal are applicable to multiple cylinder fluid motor assemblies. The four-cylinder embodiment of the invention shown in Figs. 4-13, inclusive shows that the invention is completely applicable to a fluid motor having a plurality or a plurality of pairs of cylinders.

Figure 6:
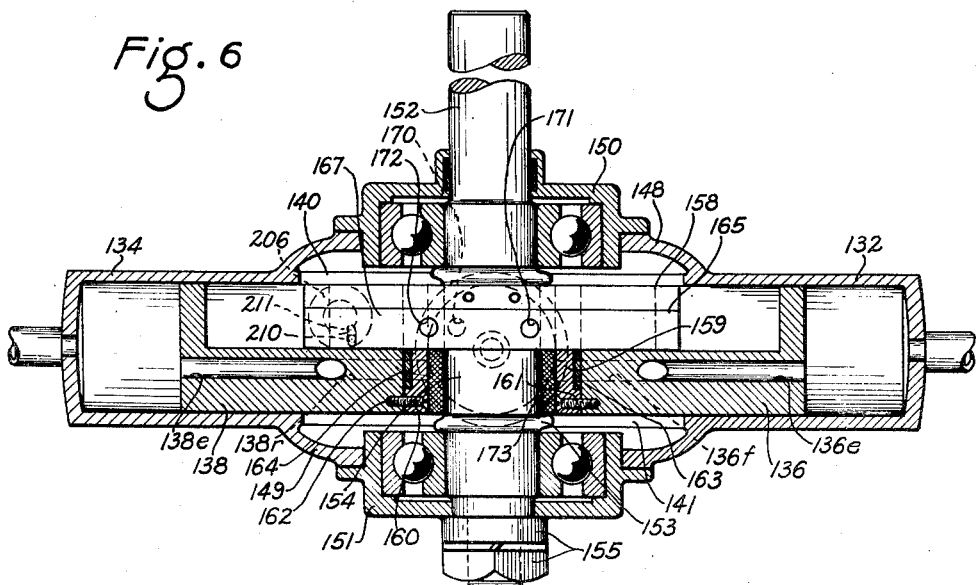
Fig. 6 is a horizontal section of said four cylinder fluid motor assembly taken on the line 6—6 of Fig. 4.
Figure 11:
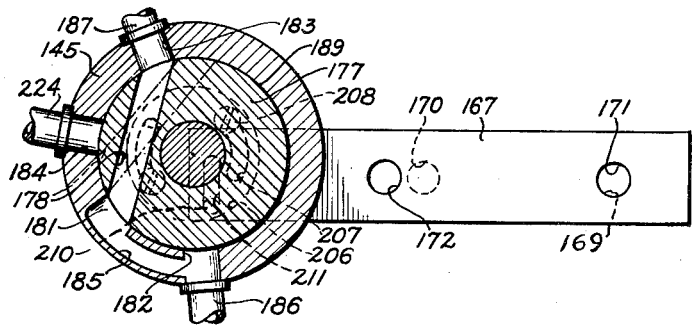
Fig. 11 is a top view of an inlet valve assembly for one direction of said four cylinder fluid motor assembly.

In the four cylinder fluid motor assembly the cylinders 131, 132, 133 and 134 are preferably arranged in quadrature and piston members 135, 136, 137 and 138 are respectively movable within the work chambers of said cylinders 131-134. As shown in Fig. 4-6 the cylinders 131-134 are formed integrally with and supported by a generally circular housing 139 having side walls 140 and 141, having a plurality of integral valve seats 142, 143, 144 and 145 respectively adjacent each of said cylinders 131-134, and provided with a shoulder 146 to which a fluid outlet pipe 147 is connected.

Each of the housing side walls 140 and 141 respectively has a dished portion 148 and 149 in which the ball bearing assemblies 150 and 151 are respectively mounted. A crank shaft 152 is journaled in said ball bearing assemblies 150 and 151 and has crank arms 153 and a crank pin 154. It will be noted from Fig. 6 that the outwardly dished portions 148 and 149 off-set the ball bearing assemblies 150 and 151 so as to provide clearance for the crank arms 153. Said crank shaft 152 carries on one end lock units 155 and a gear 156 or other suitable driven member may be mounted on the other end of shaft 152.

Each of the piston members 135-138 is provided with a fluid exhaust passage extending substantially in the direction of the working stroke of the piston member and each fluid exhaust passage has two branches, one for forward and the other for reverse rotation of the fluid motor assembly. In order to provide clearances for the motion transmitting means later to be described, the piston members 135-138 are each laterally recessed to provide an L-shaped cross-section axially as best shown in Fig. 6. Specifically piston member 136 is provided with a fluid exhaust passage 136e having a branch 136f for forward rotation and a branch 136r for reverse rotation of the fluid motor assembly. Each of the other piston members 135, 137 and 138 are provided with fluid exhaust passages and branches which will not be described in detail because of the similarity of their arrangement.

The opposite pair of piston members 136 and 138 are laterally and similarly recessed from one side, see Figs. 5 and 6, while the other opposite pair of piston members 135 and 137 are both laterally recessed from the other side or in a complementary manner.

The motion transmitting means comprises a pair of rectangular yoke members 157 and 158. Yoke member 157 has side bars 159 and 160 each attached to the inner end of the adjacent members 136 and 138 as by screws 161 and 162 and each provided in its outer face with a guideway respectively for valve plates 163 and 164. Similarly yoke member 158 has side bars 165 and 166 each attached respectively to the inner ends of the adjacent piston members 135 and 137 and each provided in its outer face with a guideway for valve plates 167 and 168. Said side bars 159, 160, 165 and 166 are each provided with a pair of ports registering respectively with the fluid exhaust branches in each piston member. For example, as shown in Fig. 4, the side bar 165 of yoke member 158 is provided with a port 169 registering with or providing a continuation of fluid exhaust branch 135f in piston member 135 and is also provided with a port 170 in alignment with fluid exhaust branch 135r in said piston member 135. Said valve plate 167, which is movable to either of two positions, as more fully explained hereinafter, has a pair of openings 171 and 172 for controlling the direction of rotation of the fluid motor assembly. In the position shown in Fig. 4 and for clockwise rotation, opening 171 in valve plate 167 registers with fluid exhaust branch 135f and with port 169 while said valve 167 closes fluid exhaust branch 135r. On the other hand when valve plate 167 is in its other position fluid exhaust branch 135f is closed and opening 172 registers with fluid exhaust branch 135r and port 170 for counter-clockwise rotation of said fluid motor assembly.

A common bearing block member 173 is journaled on crank pin 154 and has its opposite surfaces sliding within said yoke members 157 and 158 to control the opening and closing of the ports in said side bars 159, 160, 165 and 166. As the respective yoke members 157 and 158 are acted upon by successive piston members 135-138, and said bearing block member 173 revolves upon crank pin 154, said yoke members 157 and 158 move perpendicularly each with respect to the other. As a result the yoke member 158 reciprocates within the lateral recesses in piston members 136 and 138, see Fig. 6, and the length of said lateral recesses is such that there will be no interference between yoke member 158 and piston members 136 and 138 even in the extreme inner positions thereof. In the same manner the path of reciprocation of yoke member 157 is within the lateral recesses in piston members 135 and 137. Thus as each of piston members 135-138 successively executes a working stroke, the crank shaft 152 and crank pin 154 thereon are rotated by the resultant of the forces produced by two adjacent cylinders exerting pressure upon its piston members which in turn transmit the forces to the two yoke members and then to member 173.

Figure 13:
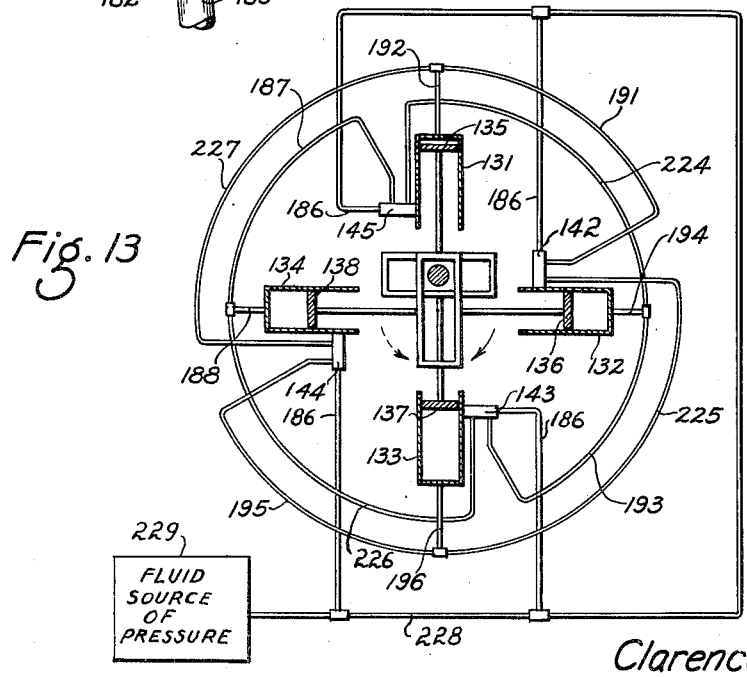
Fig. 13 is a diagrammatic illustration of the inlet lines and valves for a reversible four cylinder fluid motor assembly according to the invention.

The fluid inlet means for the four cylinder embodiment of my invention comprises an inlet valve each adjacent the next cylinder forward in the direction of rotation, valve operating means actuated by said yoke members 157 and 158, and pipe connections as shown in Fig. 13.

The inlet valve members 174-177 are respectively rotatably mounted within valve seats 142-145. Inlet valve member 177 is shown in detail in Figs. 9-12, is provided with a chordal passage 178, an axial hole 179 and carries a cross pin 180. The valve seat 145 is provided with a plurality of ports, a forward inlet port 181, a reverse inlet port 182, a forward outlet port 183, and a reverse outlet port 184, see Figs. 14 and 15, said forward and reverse inlet ports 181 and 182 being preferably connected by a passage 185. A fluid inlet pipe 186 is connected to a source of fluid under pressure by a fluid supply main 228 leading from a source of fluid pressure 229 and connected to each of fluid inlet pipes 186, each of which conducts such fluid pressure to the respective forward and reverse inlet ports 181 and 182. Said forward outlet port 183 is connected to a forward fluid outlet pipe 187 which leads to the inlet pipe 188 connected through the head of cylinder 134 to the work chamber therein. In a similar manner the forward outlet port from valve seat 142 is connected by a pipe 191 to inlet pipe 192 leading into cylinder 131, the forward outlet port from valve seat 143 is connected by pipes 193 and 194 to cylinder 132, and the forward outlet port from valve seat 144 is connected by pipes 195 and 196 to cylinder 133.

The inlet valve operating means comprises an actuating member mounted upon one of the yoke members and causing oscillation of the inlet valve members. As shown, a valve actuating rod 189 is mounted upon the side bar 165 of yoke member 158 and reciprocates within the axial hole 179 in inlet valve member 177. Said valve actuating rod 189, see Fig. 7, is provided with a transverse slot 190 through which extends the cross pin 180 of valve member 177. The upper half of slot 190 is perfectly straight and imparts no movement to cross pin 180 but the lower half of slot 190 is spiraled sufficiently to move cross pin 180 and oscillate inlet valve member 177 from the closed or dot-dash line position shown in Fig. 11 to the open or solid line position shown in Fig. 11, and then return said valve member 177 to its original open position. In other words, with yoke member 158 in its uppermost position as shown in Fig. 4, valve member 177 is open and fluid under pressure is passing from fluid inlet pipe 186 through passage 185, forward inlet port 181, chordal passage 178, forward outlet port 183, forward fluid outlet pipe 187 and inlet pipe 188 into the work chamber of cylinder 134. During the succeeding 90° rotation of crank pin 154, said valve 177 is being closed according to the curvature of the lower half of slot 190 and just as piston member 138 completes its working stroke valve 177 is completely closed. Since the upper half of slot 190 is straight said valve 177 remains closed during the next 180° rotation of crank pin 154. Then as the crank pin 154 crosses the center line of cylinder 134 or at 270° from the position shown in Fig. 4, the yoke member 158 moves the lower half of slot 190 past cross pin 180 and causes an opening of valve member 177 so that fluid under pressure through the path already traced starts the working stroke of piston member 138.

In a similar manner valve actuating rod 197 is mounted on and moves with side bar 159 of yoke member 157, is provided with a slot 198 and actuates the cross pin 199 in inlet valve member 174. Valve actuating rod 200 is mounted on and moves with the side bar 166 of yoke member 158, is provided with a slot 201 and oscillates the cross pin 202 in inlet valve member 175. Also valve actuating rod 203 is mounted upon and moves with side bar 160 of yoke member 157, is provided with a slot 204 and oscillates the cross pin 205 in inlet valve member 176.

The contour of said slots 190, 198, 201 and 204 in the respective valve actuating rods may be varied to give any desired or known character of valve operation that is deemed necessary or desirable or that may be required by the nature of the fluid supplied under pressure.

Said valve actuating rods 189, 197, 200 and 203 are each rotatably mounted on the respective side bars 165, 159, 166 and 160 of yoke members 157 and 158. For example, valve actuating rod 189 has a flange 206 provided with arcuate slots 207 engaging headed bolts 208 on side bar 165 and has a handle 209 whereby said rod 189 may be turned manually through an angle determined by the length of said arcuate slots 207. An eccentric pin 210 depends from flange 206 and engages a transverse slot 211 in valve plate 167, see Figs. 4 and 11. When handle 209, rod 189 and valve plate 167 are in one extreme position, the opening 171 in valve plate 167 registers with fluid exhaust branch 135f and port 169 and vice versa when handle 209, rod 189, and valve plate 167 are in the other extreme position the opening 172 registers with fluid exhaust branch 135r and port 170 and said valve plate 167 closes fluid exhaust branch 135f.

In a similar manner, a handle 212 on valve actuating rod 200 can be operated to move valve plate 168 to either of two positions alternatively to open ports 213 and 214 in side bar 166 and respectively in alignment with the fluid exhaust branches in piston member 137. Likewise a handle 215 on valve actuating rod 197 can be operated to move valve plate 163 to either of two positions alternatively to open ports 216 and 217 in side bar 159 and respectively in alignment with the fluid exhaust branches in piston member 132. Finally a handle 218 on valve actuating rod 203 is shifted to either of two positions to move valve plate 164 alternatively to open ports 219 and 220 in side bar 160 and in communication with the fluid exhaust branches in piston member 138.

The fluid outlet means comprises the fluid exhaust passages in each piston member and also an exhaust valve or port controlled by the motion transmitting means in timed relation to the operation of the fluid inlet valves which are also operated by said motion transmitting means. Specifically, as shown the bearing block member 173 controls the opening and closing of the fluid exhaust ports 169, 216, 213 and 219 in proper sequence and at the proper time.

Assuming valve overlaps corresponding to 5° movement of the crank pin 154, clockwise rotation, and taking the position of crank pin 154 in Fig. 4 as 0°, the relative operation of the inlet and outlet valves by the arrangement just described is as follows: ("C" indicates that the valve or port is closed and "O" indicates that the valve or port is open.)

| Degrees | Cylinder 131 | | Cylinder 132 | | Cylinder 133 | | Cylinder 134 | |
|---|---|---|---|---|---|---|---|---|
|  | 174 | 169 | 175 | 216 | 176 | 213 | 177 | 219 |
| 0° | C | C | C | O | C | C | O | C |
| 5°–85° | O | C | C | O | C | O | O | C |
| 90° | O | C | C | C | C | O | C | C |
| 95°–175° | O | C | O | C | C | O | C | O |
| 180° | C | C | O | C | C | C | C | O |
| 185°–265° | C | O | O | C | O | C | C | O |
| 270° | C | O | C | C | O | C | C | C |
| 275°–355° | C | O | C | O | O | C | O | C |

It is now clear that the working strokes in the respective cylinders occur successively in a clockwise direction, that the working strokes in two adjacent cylinders overlap, and that the inlet valves are closed while the exhaust ports are open during the successive return strokes in the respective cylinders. Also the fundamental principle of the invention is fully utilized in that the discharge of fluid from each cylinder occurs during the return strokes of the piston members and substantially in the direction of fluid movement causing the working strokes of said piston members. The fluid discharged from the exhaust ports 169, 216, 213 and 219 collects in the lower portion of housing 139 from where it may be drained or drawn by suction through the outlet pipe 147 preferably for recirculation through the motor assembly.

On many occasions it is very desirable that a fluid motor assembly be reversible and the multiple cylinder fluid motor assembly of the invention is especially adaptable for reversal. In order to reverse the fluid motor assembly shown in Figs. 4–13 it is merely necessary to rotate each of valve actuating rods 189, 197, 200 and 203 to their other extreme positions by moving the respective handles 209, 215, 212 and 218.

Figure 12:
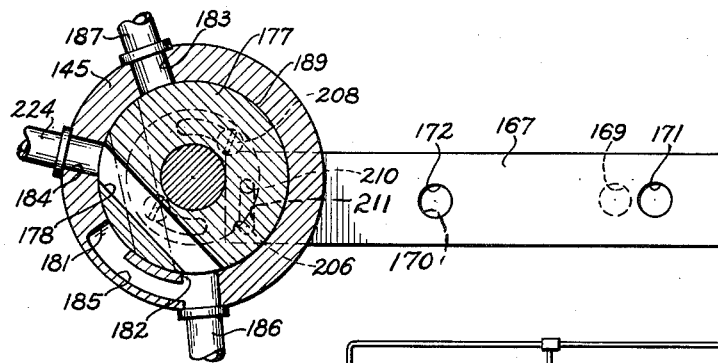
Fig. 12 is also a top view of said inlet valve assembly set for opposite rotation of said four cylinder fluid motor assembly.

For example, when handle 209 is rotated, valve actuating rod 189 is also turned until the other ends of arcuate slots 207 abut the headed bolts 208, see Fig. 12. Ordinarily the friction between flange 206, and the heads of the bolts 208 and side bar 165 and between valve plate 167 and side bar 165 and the inner end of piston member 135 is sufficient to maintain said rod 189 in its manually set position and to actuate the cross pin 180 of inlet valve member 177. Optionally a ball detent 221 is pressed by a spring 222 into either of dimples 223 in flange 206 to hold the valve actuating rod 189 in either of its manually set positions.

The rotation of the valve actuating rods as just described serves several purposes, first, it closes the forward fluid exhaust branches in the piston members and opens the reverse fluid exhaust branches therein, second, the fluid inlet valves are rotated to direct the incoming fluid controlled thereby into the next following cylinder in the direction of rotation, which is now reversed, and to change the timing of said inlet valves relative to the closing and opening by the bearing block member 173 of the reverse fluid exhaust branches in the piston members in the cylinders to which the inlet valves are now connected. The consequences of rotation of the manually operable reversing handles 209, 215, 212 and 218 can be best understood by reference to Fig. 12 and by comparing it to Fig. 11. Irrespective of the longitudinal position of cross pin 180 in slot 190 of valve actuating rod 189, counterclockwise rotation of said rod 189 by similar rotation of handle 209 rotates inlet valve member 177, for example, from the full line position shown in Fig. 11 to the dot-dash line position shown in Fig. 12. As a result reciprocation of the valve actuating rod 189, by reason of the reciprocation of yoke member 158, now oscillates inlet valve member 177 between the full line and dot-dash line positions shown in Fig. 12. In other words, manual rotation of valve actuating rod 189 has moved inlet valve member 177 so that its oscillation thereby now moves chordal passage 178 into and out of registry with reverse inlet port 182 and reverse outlet port 184. Said reverse outlet port 184 from valve seat 145 is connected by a pipe 224 to the pipe 194 leading into cylinder 132, see Fig. 13. In a similar manner, the reverse outlet port from valve seat 142 is connected by a pipe 225 to the pipe 196 leading into cylinder 133, the reverse outlet port from valve seat 143 is connected by a pipe 226 to inlet pipe 188 leading into cylinder 134, and the reverse outlet port from valve seat 144 is connected by a pipe 227 to the pipe 192 leading into cylinder 135.

Referring now to Fig. 4 and assuming counterclockwise rotation of crank pin 154, it will be noted that bearing block member 173 now successively opens and closes the reverse fluid exhaust ports 170, 220, 214 and 217 and the reverse fluid exhaust branches in each of piston members 135, 138, 137 and 136 in proper timed relation to the opening and closing of the fluid inlet valves by the respective valve actuating rods 203, 200, 197 and 189.

A clearer understanding of the relative operation of the inlet and exhaust valves will be obtained from a tabulation of the valve positions during one cycle of operation. Assuming valve overlaps corresponding to 5° movement of crank pin 154, counterclockwise rotation, and that the position of crank pin 154 shown in Fig. 4 is 0°, and indicating a closed valve or port by "C" and an open valve or port by "O," the relative operation of the inlet and outlet valves just described is as follows:

| Degrees | Cylinder 131 | | Cylinder 134 | | Cylinder 133 | | Cylinder 132 | |
|---|---|---|---|---|---|---|---|---|
| | 176 | 170 | 175 | 220 | 174 | 214 | 177 | 217 |
| 0° | C | C | C | O | C | C | O | C |
| 5°–85° | O | C | C | O | C | O | O | C |
| 90° | O | C | C | O | C | O | C | C |
| 95°–175° | O | C | O | C | C | O | C | O |
| 180° | C | C | O | C | C | O | C | O |
| 185°–265° | C | O | O | C | O | C | C | O |
| 270° | C | O | C | C | O | C | C | O |
| 275°–355° | C | O | C | O | O | C | O | C |

Similarly to the sequences for forward rotation, it is noted that the working strokes, indicated by open inlet valves occur simultaneously for successive cylinders in the direction of rotation such as 131 and 134 during 95°–175° while the working stroke for cylinder 134 also overlaps the working stroke for cylinder 133 during 185°–265°. A similar observation can be made for the return strokes which are indicated by open exhaust ports.

Many variations of the present invention are possible. As shown herein the inlet and outlet valves may be operated by the motion transmitting means but the invention in its broadest aspects contemplates any type of control for fluid inlets or outlets as long as the fluid exhaust from a cylinder is substantially in the direction of the fluid movement causing the working stroke of the piston. Also the reversing means shown may be applied to various types of fluid motor assemblies. In short the present disclosure is only illustrative and the true scope of the invention is defined by the claims which follow.

Having now particularly described my invention what I desire to secure by Letters Patent of the United States and what I claim is:

1. A fluid motor assembly comprising a cylinder providing a work chamber, a piston member within said work chamber, having a working stroke and a return stroke, and provided with a passage for discharging fluid from said chamber substantially in the direction of said working stroke, and a motion transmitting means operatively connected to said piston member and including a member reciprocating transversely of said piston member in timed relation to the working and return strokes thereof and closing said fluid passage during the working stroke of said piston member and opening said passage during the return stroke of said piston member.

2. A fluid motor assembly comprising a cylinder providing a work chamber with an open end, a housing enclosing the open end of said cylinder, a crank shaft rotatably mounted in said housing, a piston member within said work chamber, having a working stroke and a return stroke, and provided with a passage for discharging fluid substantially in the direction of said working stroke, and a motion transmitting means between said piston member and said crank shaft and including a member moving transversely of said piston member in timed relation to reciprocation thereof and closing said fluid passage during the working stroke of said piston member and opening said passage during the return stroke of said piston member.

3. A fluid motor assembly comprising a cylinder providing a work chamber, a piston member within said work chamber, having a working stroke and a return stroke, and provided with a passage for discharging fluid from said chamber substantially in the direction of said working stroke, and a motion transmitting means including a rectangular yoke member connected to the end of said piston member and provided with a discharge opening communicating with said passage and including a rectangular bearing member reciprocating within said yoke member to close said discharge opening during the working stroke of said piston member and to uncover said discharge opening during the return stroke of said piston member.

4. A fluid motor assembly comprising a plurality of cylinders each providing a work chamber, a piston member in each of said cylinders, having a working stroke and a return stroke, and provided with a passage for discharging fluid substantially in the direction of the working stroke of said piston member, a shaft rotatably mounted, a motion transmitting means connected between each piston member and said shaft, a fluid inlet means connected to each work chamber and including a valve member, a fluid outlet means including a valve member for controlling the fluid discharge passage in each piston member, and valve operating means operatively connected to said motion transmitting means, opening the valve in each fluid inlet means during the working stroke of the respective piston member, and opening the valve in each fluid outlet means during the return stroke of the respective piston member.

5. A fluid motor assembly comprising a pair of cylinders mounted in opposed spaced relation on an axis and each providing a work chamber, a pair of piston members each within respective work chambers, one piston member having a working stroke and return stroke respectively during the return stroke and working stroke of the other piston member and each provided with a passage oppositely displaced with respect to said axis between said cylinders and for discharging fluid from the respective work chamber substantially in the direction of the respective working stroke, and a motion transmitting means operatively connected between said piston members and including a single member reciprocating transversely of said piston members in timed relation to the working and return strokes thereof and for closing the fluid passages in each piston member during its working stroke and alternately opening each fluid passage during the return stroke of each piston member.

6. A fluid motor assembly comprising a cylinder providing a work chamber, a piston member having a working stroke and a return stroke within said chamber and provided with a passage for discharging fluid substantially in the direction of said working stroke, a motion transmitting means operatively connected to said piston member and including a bearing block and a yoke bar operatively connected between said piston member and said bearing block and both reciprocating transversely of said piston member in timed relation thereto, a fluid inlet means connected to said work chamber and including a valve operated by said yoke bar to introduce fluid into said work chamber during the working stroke thereof and to interrupt said fluid during the return stroke of said piston member, and a fluid outlet means operated by said bearing block to open the passage in said piston member during the return stroke thereof and to close said passage during the working stroke of said piston member.

7. A fluid motor assembly for rotating a shaft about an axis comprising two pairs of cylinders each providing a work chamber and arranged in quadrature about said axis, a piston member in each of said cylinders and having a working stroke and a return stroke, a motion transmitting means operatively connected between each of said piston members and said shaft and including one member movable with one of the opposite pairs of piston members and a second member movable with the other of the opposite pairs of piston members, a fluid inlet means connected to each work chamber and including an inlet valve, and an inlet valve operating means mounted upon said other member of said motion transmitting means and operatively connected to the inlet valve for the cylinder next behind in the direction of rotation.

8. A fluid motor assembly for driving a shaft about its axis comprising two pairs of cylinders each providing a work chamber and arranged in quadrature about said axis with the center line of each cylinder in a plane perpendicular to said axis, a piston member in each of said cylinders and having a working stroke and a return stroke, both piston members of the opposite pairs being laterally recessed to form L-shaped cross-sections and each being provided with a passage for discharging fluid substantially in the direction of the working stroke of said piston member, a housing connected to the inner ends of all of said cylinders, a crank shaft rotatably mounted in said housing and having a crank pin, a pair of rectangular yoke members each connected at opposite sides of each of the piston members of opposite pairs, a crank bearing mounted on said crank pin, slidable in both of said yoke members and opening the passage through each piston member at the end of its working stroke for rapid fluid discharge into said housing, a fluid inlet means connected to each work chamber and including a valve, and valve operating means actuated by said yoke members and timed to open the valve of each fluid inlet means as the respective piston member starts its working stroke and to close such inlet valve at the end of said working stroke.

9. A reversible fluid motor assembly comprising a cylinder providing a work chamber, a piston member movable within said work chamber, an axle rotatably mounted, a motion transmitting means connected between said piston member and axle and converting the reciprocation of said piston member into rotation of said axle, a fluid inlet means connected to said work chamber for introducing fluid thereinto to displace said piston member for its working stroke, a fluid outlet means operated in timed relation to said piston member and providing a fluid exhaust passage from said chamber in a direction substantially the same as that of the working stroke of said piston member, and a reversing means actuating said fluid inlet and outlet means and for changing the times of opening and closing of said means to reverse the direction of rotation of said axle.

10. A fluid motor assembly comprising a cylinder providing a work chamber, a piston member having a working stroke and return stroke within said chamber and provided with a passage for discharging fluid substantially in the direction of said working stroke, a motion transmitting means connected to said piston member and including a rotatable shaft, a fluid inlet means connected to said work chamber and including an inlet valve member, a fluid outlet means including an outlet valve member controlling the discharge of fluid through said passage, a valve operating means operatively connected to said motion transmitting means, opening said inlet valve member during the working stroke of said piston member and opening said outlet valve member during the return stroke of said piston member, and a reversing means operatively connected to said inlet and outlet valve members and setting them to open and close at the same relative times for reverse rotation of said motor assembly.

11. A reversible fluid motor assembly comprising a cylinder providing a work chamber, a piston member having a working stroke and return stroke within said chamber and provided with a pair of passages for discharging fluid substantially in the direction of said working stroke, an axle rotatably mounted, a motion transmitting means connected between said piston member and axle and converting the reciprocation of said piston member into rotation of said axle, a fluid inlet means connected to said work chamber and introducing fluid thereinto to displace said piston member for its working stroke, a fluid outlet means operated in timed relation to said piston member and opening either one of said passages in said piston member, and a reversing means actuating said fluid inlet means and said fluid outlet means, for changing the times of opening and closing of said means and including a member for opening the other of said passages and closing said one passage in said piston member for reversing the direction of said axle.

12. A reversible fluid motor assembly comprising a plurality of cylinders each providing a work chamber, a piston member in each of said cylinders, having a working stroke and a return stroke, and provided with a passage for discharging fluid substantially in the direction of the working stroke of said piston member, a shaft rotatably mounted, a motion transmitting means connected between each piston member and said shaft, a fluid inlet means connected to each work chamber and including a valve member, a fluid outlet means including a valve member controlling the fluid discharge passage in each piston member, valve operating means opening the valve in each fluid inlet means during the working stroke of the respective piston member and opening the valve in each fluid outlet means during the return stroke of the respective piston member, and reversing means including a reversing valve for the fluid outlet means and operatively connected to the valve of said fluid inlet means and said reversing valve and movable to alter the positions of said valves for rotation of said fluid motor assembly in the opposite direction.

13. A reversible fluid motor assembly comprising a cylinder providing a work chamber, a piston member having a reciprocating stroke within said chamber and provided with a pair of passages for discharging fluid substantially in the direction of its movement for displacing said piston member, and a reversing member operatively associated with said piston member, movable to one position to open one and close the other of said passages, and movable to another position to close said one and open said other of said passages.

CLARENCE RAY BUTTON.

REFERENCES CITED

The following references are of record in the file of this patent:

UNITED STATES PATENTS

| Number | Name | Date |
| --- | --- | --- |
| 313,728 | Hardy | Mar. 10, 1885 |
| 492,267 | Bruce | Feb. 21, 1893 |
| 1,079,934 | Cheyne | Dec. 2, 1913 |
| 1,423,386 | Bair | July 18, 1922 |

FOREIGN PATENTS

| Number | Country | Date |
| --- | --- | --- |
| 437,568 | France | Feb. 22, 1912 |
| 442,425 | France | June 20, 1912 |
| 22,645 | Great Britain | Oct. 2, 1897 |
| 481,093 | Great Britain | Mar. 7, 1938 |